United States Patent
Corkum

[11] Patent Number: 6,134,455
[45] Date of Patent: *Oct. 17, 2000

[54] ANNUNCIATING APPARATUS, AND ASSOCIATED METHOD, FOR RADIO COMMUNICATION DEVICE

[75] Inventor: David C. Corkum, Oshawa, Canada

[73] Assignee: Nokia Mobile Phones Limited, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 09/107,257
[22] Filed: Jun. 30, 1998
[51] Int. Cl.7 .................. H04Q 1/00; H04B 1/38
[52] U.S. Cl. .................. 455/567; 455/38.2; 455/73; 455/88; 455/501; 455/575; 379/373; 379/375; 379/390; 379/418
[58] Field of Search .................. 455/567, 73, 575, 455/38.2, 501, 88; 379/418, 390, 373, 375

[56] References Cited

U.S. PATENT DOCUMENTS

| | | | |
|---|---|---|---|
| 4,076,968 | 2/1978 | Wattenbarger | 455/567 |
| 4,178,548 | 12/1979 | Thompson | 379/418 |
| 5,170,499 | 12/1992 | Grothause | 455/567 |
| 5,337,356 | 8/1994 | Shinozaki | 379/418 |
| 5,404,582 | 4/1995 | Demuro et al. | 455/567 |
| 5,844,983 | 12/1998 | Lilja | 379/418 |
| 5,870,684 | 2/1999 | Hoashi et al. | 455/567 |

*Primary Examiner*—Lee Nguyen
*Assistant Examiner*—Simon Nguyen
*Attorney, Agent, or Firm*—Robert H. Kelly; Holland & Hart LLP

[57] ABSTRACT

Annunciator apparatus, and an associated method, for a mobile station, such as a radio telephone operable in a cellular communication system. When a call is to be terminated at the mobile station, a determination is made of the ambient noise levels proximate to the mobile station. Responsive to the determinations of the ambient noise level, selection is made of the loudness level of the ringing tone to be generated by an annunciator, used to annunciate the terminating call. Thereby, the loudness level of the ringing tone generated by the annunciator is of a loudness level appropriate for the conditions at which the mobile station is positioned.

8 Claims, 4 Drawing Sheets

ANNUNCIATING APPARATUS, AND ASSOCIATED METHOD, FOR RADIO COMMUNICATION DEVICE

The present invention relates generally to radio devices, such as a radio telephone, operable in a radio communication system in which a call can be terminated at the radio device. More particularly, the present invention relates to annunciating apparatus, and an associated method, which annunciates, e.g., with an intermittent ringing tone, an incoming call to be terminated at the radio device. The loudness of the ringing tone, or other magnitude level of the annunciation is selectable.

The magnitude level of the annunciation is a function of the ambient noise levels proximate to the radio device. When, for example, the incoming call is annunciated by a ringing tone, the loudness of the ringing tone is dependent upon the ambient noise levels. At higher levels of ambient noise, the ringing tone is caused also be louder, thereby to remain noticeable over the ambient noise. Through operation of an embodiment of the present invention, the ringing of the radio telephone is caused to be of an appropriate loudness. When there is only a low level of ambient noise, the ringing is of a relatively low loudness level. Thereby, a user of the radio telephone is able to hear the ringing, but the ringing is not inappropriately loud. And, when there is a high level of ambient noise, the loudness of the ringing is increased to a level to permit a user to hear the ringing over the ambient noise.

BACKGROUND OF THE INVENTION

Utilization of wireless communication systems to communicate telephonically has achieved wide popularity in recent years. Both voice and data information can be communicated telephonically through the use of such systems.

Because a wire line connection is not required to effectuate telephonic communication, communication by way of a wireless communication system is possible at a location to which formation of a wire line connection would be impractical or impossible.

Various cellular communication systems have been developed and implemented throughout large geographical areas. Large numbers of subscribers to such cellular networks are able to communication telephonically when positioned in areas encompassed by such cellular networks. Cellular communication networks have been developed and implemented utilizing, e.g., FDMA (frequency division multiple access), TDMA (time division multiple access), CDMA (code division multiple access) techniques, and various combinations of such techniques.

A user communicates with the infrastructure of a cellular communication network through the use of a radio telephone, sometimes referred to as a mobile station. The mobile station receives down link signals on a forward link and transmits up link signals on a reverse link. Thereby, two-way communications are provided between the infrastructure of the cellular network and the mobile station.

A mobile station is generally constructed in a manner such that its user interface mimics, to a great extent, operation of a conventional, wire line device. For instance, when a user originates a call at the mobile station, the user enters the number of the party which is to be called in manners analogous to the entry of the numbers identifying the party to be called in a conventional wire line system. And, when a call, originated elsewhere, is to be terminated at a the mobile station, the mobile station generates a ringing tone, or otherwise annunciates, that a call is to be terminated at the mobile station.

The mobile station generates the ringing tone, or other annunciation, responsive to transmission to, and reception at, the mobile station of a paging signal. In some cellular networks, the paging signal is transmitted upon a control channel to which the mobile station is selectively, and automatically, tuned. While control signaling, transparent to a user of the mobile station, also occurs responsive to reception at the mobile station of the paging signal, the user accepts the call in a manner analogous to a user of a conventional wire line telephone. In some mobile stations, a terminating call is accepted by actuating a receive key on an actuation keypad.

When the call is accepted, the ringing tone is stopped, and telephone communications commence on the forward and reverse links formed between the mobile station and the infrastructure of the cellular network.

Because of the mobility provided by a mobile station, the mobile station can be carried by a user to locations at which calls have not traditionally been terminated. Because of the ability now to carry a mobile station to almost any location, there is a need to ensure that a call terminating at the mobile station does not result in a ringing tone generated to annunciate the termination of the call at the mobile station at a level of loudness which is inappropriate for the location at which the mobile station is positioned. For instance, when the mobile station is positioned at a location at which there is little background, or other ambient, noise, there is generally little need to generate a loud ringing tone to annunciate the terminating call. Conversely, when the mobile station is positioned at a location at which there is a significant level of background, or other ambient, noise, the ringing tone can be of an increased level of loudness to facilitate a user's detection of the ringing tone.

A manner by which to select the loudness of the ringing tone, or magnitude of other annunciation, which annunciates the reception of a paging signal at a mobile station would therefore be advantageous.

It is in light of this background information relating to terminating a call at a mobile station that the significant improvements of the present invention have evolved.

SUMMARY OF THE INVENTION

The present invention, accordingly, advantageously provides annunciating apparatus, and an associated method, which annunciates an incoming call to be terminated at the radio device. The magnitude level of the annunciation is selected responsive to determined levels of ambient noise proximate to the radio device.

In one aspect of the present invention, a ringing tone annunciates reception of a paging signal indicating an incoming call to be terminated at the radio device. The loudness of the ringing tone is selectable responsive to determinations of ambient noise levels at the radio device. When a call is to be terminated at the radio device, the ambient noise levels proximate to the radio device are determined. Responsive to such determinations, selection is made of the loudness level of the ringing tone to be generated at the radio device to annunciate to a user of the incoming call. Selection is made better to assure that a user of the radio device is able to hear the ringing tone when the ambient noise levels are relatively high and also better to assure that the loudness level of the ringing tone is not inappropriately high when the ambient noise levels are relatively low.

In an exemplary implementation, the annunciating apparatus of an embodiment of the present invention forms a portion of a cellular radio telephone operable in a cellular radio communication system. The cellular communication system includes network infrastructure coupled to a PSTN (public-switched telephonic network). When a call is initiated by a calling party to be terminated at a particular radio telephone, the network infrastructure causes a paging signal to be transmitted to the radio telephone. The paging signal is transmitted to inform the radio telephone of the call which is to be terminated at the radio telephone. Responsive to detection of the paging signal at the radio telephone, the ambient noise levels proximate to the radio telephone are determined. Selection is made of the loudness level at which to generate a ringing tone to announce the incoming call to the user of the radio telephone. The user of the radio telephone is thereby able to accept the call and effectuate communications by way of the radio telephone.

In one implementation, the speaker of the transmitter portion of the radio telephone is utilized to determine the ambient noise levels. When the paging signal is received at the radio telephone, ambient noise levels are determined during a selected time period subsequent to reception of the paging signal. The audio energy transduced by the speaker during the selected time period is determinative of the ambient noise levels proximate to the radio telephone. The loudness level of the ringing tone subsequently to be generated at the radio telephone is selected responsive to such transduced audio energy. As a result, a user of the radio telephone is able to hear the ringing tone generated at an appropriate loudness level. At increased levels of ambient noise, the ringing tone is caused to be of a relatively loud level. And, at low levels of ambient noise, the ringing tone is caused to be of a relatively low loudness level.

In these and other aspects, therefore, annunciator apparatus, and an associated method, annunciates reception of a paging signal terminating at radio receiver circuitry of a radio device. An ambient noise level determiner is coupled to receive indications of ambient noise proximate to the radio device. The ambient noise level determiner determines at least a relative level of the ambient noise proximate to the radio device. An annunciation signal level selector is coupled to the ambient noise level determiner. The annunciation signal level selector generates an annunciation signal for causing annunciation of the reception of the paging signal at a selected annunciation magnitude. The selected annunciation magnitude is responsive to determinations of the level of the ambient noise determined by the ambient noise level determiner.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
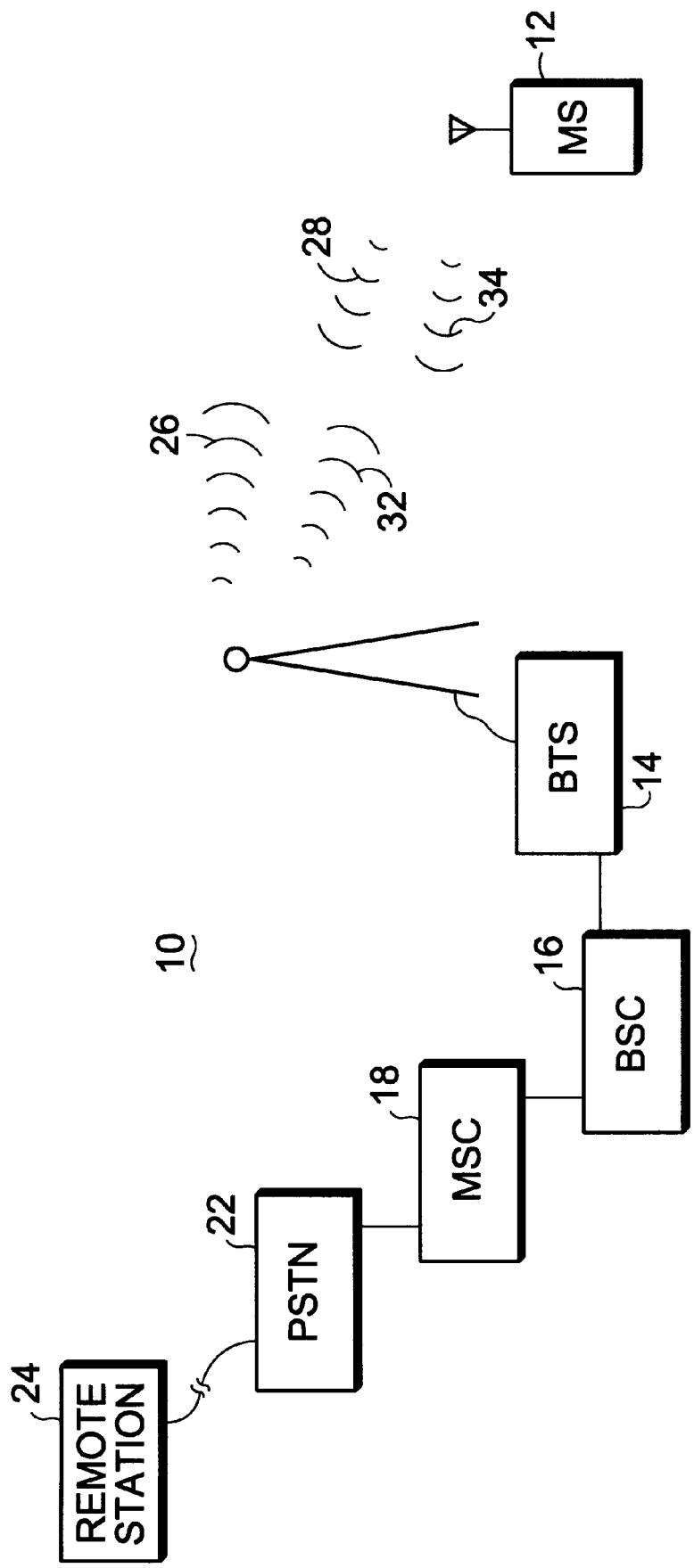
FIG. 1 illustrates a functional block diagram of a portion of a portion of a radio communication system permitting termination of a call at a mobile station.

Referring first to FIG. 1, a portion of a cellular communication system shown generally at 10, illustrates transmission of communication signals between the network infrastructure of the system and a mobile station 12. In the exemplary implementation, the network infrastructure is formed of the infrastructure of a cellular communication system. Here the network infrastructure is shown to include a base transceiver station (BTS) 14, a base station controller (BSC) 16, and a mobile switching center (MSC) 18. In conventional manner, a mobile switching center 18 is coupled to a plurality of base station controllers 16 and, in turn, a single base station controller 16 is coupled to a plurality of base transceiver stations 14. The mobile switching center 18 is further coupled to a public-switched telephonic network (PSTN) 22. In other implementations, the mobile station 12 is operable in other communication systems, and an embodiment of the present invention is analogously operable pursuant to communications in such other communication systems.

During exemplary operation of the communication system 10, calls can be originated and terminated at the mobile station 12. For instance, a call can be originated at a remote station, e.g., the remote station 24, coupled to the PSTN 22. The network infrastructure of the communication system 10 causes a paging signal, here the paging signal 26, to be transmitted to the mobile station 12 to page the mobile station of the call to be terminated at the mobile station. The paging signal 26 is a control signal and is part of the signaling overhead associated with the communication system 10. When the mobile station 12 receives the paging signal, an acknowledgment signal 28 is generated and returned to the network infrastructure. Thereafter, if a user of the mobile station accepts the terminating call, communications between the remote station 24 and the mobile station 12 commence. Here, down link signals 32 are generated upon a forward link formed between the network infrastructure and the mobile station, and up link signals 34 are generated upon a reverse link formed between the mobile station and the network infrastructure.

During operation of an embodiment of the present invention, reception at the mobile station of the paging signal 26 initiates a determination of ambient noise levels positioned proximate to the mobile station. Responsive to such determination, the loudness level of a ringing signal, used to annunciate to a user of the terminating call, is selected. Annunciator circuitry of the mobile station 12 is caused to generate a ringing signal of an amplitude level appropriate for the environment in which the mobile station is positioned. That is to say, when ambient noise levels are relatively low, i.e., the mobile station is positioned in a "quiet" environment, the ringing tone need only be of a relatively low amplitude for a user of the mobile station to detect the ringing tone. But, when the ambient noise levels are relatively high, i.e., the mobile station in positioned in a "loud" area, the ringing tone is caused to be of a greater amplitude, thereby better to facilitate a user's recognition of the ringing tone.

Figure 2:
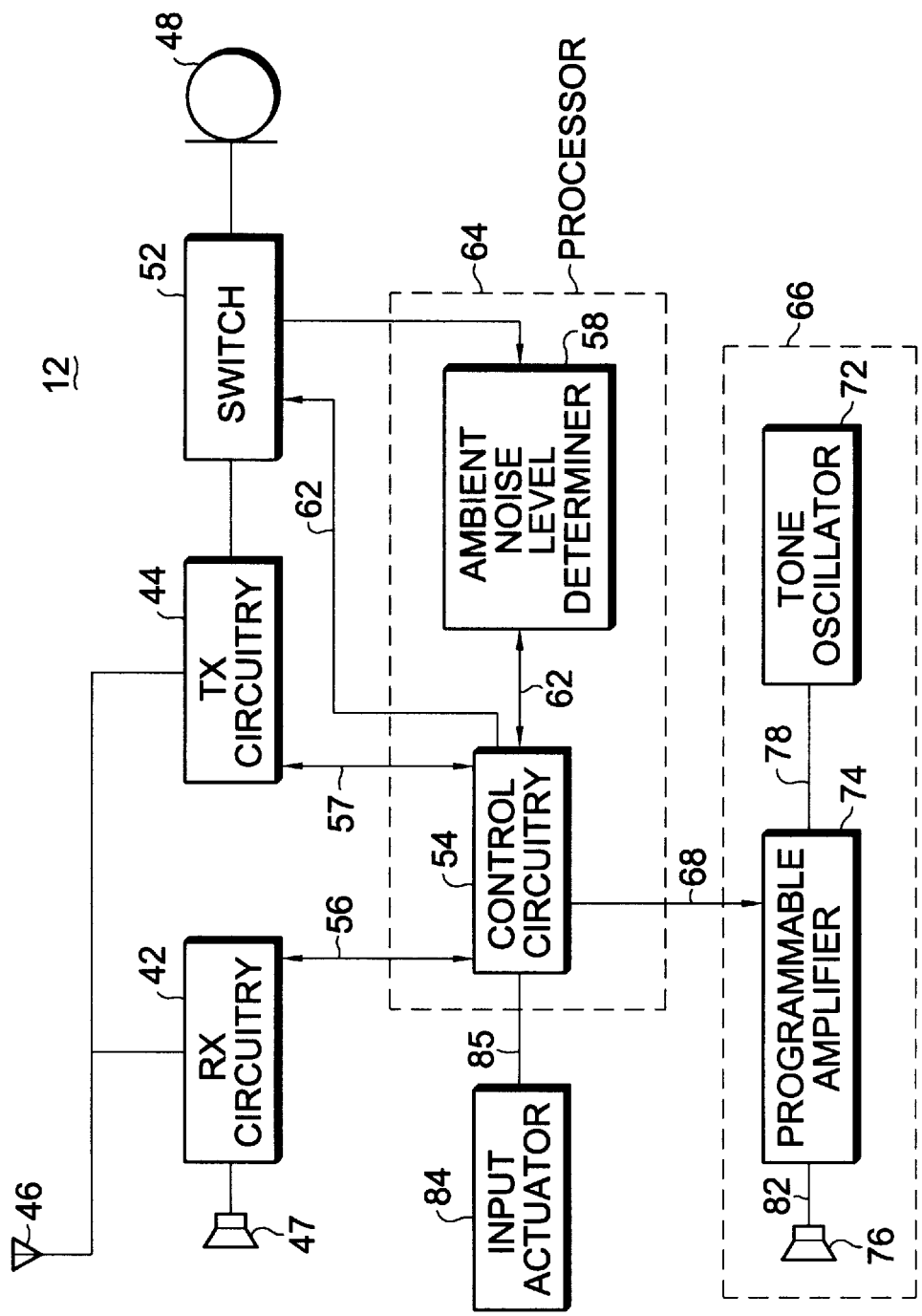
FIG. 2 illustrates a functional block diagram of a mobile station in which an embodiment of the present invention is operable.

FIG. 2 illustrates the mobile station 12, shown in FIG. 1, in greater detail. Here, again, the mobile station 12 is exemplary of a radio communication device operable in a cellular communication system. The structure of the mobile station 12 is, however, also analogous to other types of radio devices, and an embodiment of the present invention can similarly be implemented in such other types of devices.

The mobile station 12 includes both receiver circuitry 42 and transmitter circuitry 44. The circuitry 42 and 44 are coupled, e.g., through a filter duplexor (not shown) to an antenna transducer 46. The antenna transducer 46 is operable to transduce electromagnetic signals, such as the paging signal 26 and the down link signals 32 (both shown in FIG. 1) received at the mobile station. The antenna transducer 46 is further operable to convert electrical signals generated by the transmitter circuitry 44 into electromagnetic form to form, e.g., acknowledgment signals 28 and up link signals 34 (both shown in FIG. 1).

The receiver circuitry 42 is coupled to a speaker 46. The speaker 46 is operable to generate audio signals representative of signals received and processed by the receiver circuitry 42. In an implementation in which the mobile station 12 forms a portable radio telephone, the speaker 46 is positioned at hand set portion of the radio telephone positionable proximate to an ear of a user of the radio telephone.

The transmitter circuitry 44 is coupled to a microphone 48, here by way of a switch element 52. Audio signals are transduced by the microphone 48 into electrical form and are selectively provided to the transmitter circuitry 44, depending upon the switch position of the switch element 52. The transmitter circuitry 44 generates signals, inter alia, responsive to the electrical signals formed by the microphone 48.

The mobile station 12 further includes control circuitry 54 coupled to the receiver circuitry 42 by way of the lines. 56, coupled to the transmitter circuitry 44 by way of the lines 58, and to the switch element 52 by way of the line 62. The control circuitry is operable, in conventional manner, to control operation of the receiver and transmitter circuitry 42 and 44. The control circuitry 54 is also operable to control the switch position of the switch element 52. In a first switch position, and as above-noted, switch element 52 couples the transmitter circuitry 44 together with the microphone 48. The switch element 52 is further positionable in a second switch position to couple the microphone 48 at least alternately to an ambient noise level determiner 58.

The ambient noise level determiner 58 is operable to determine ambient noise levels proximate to the mobile station 12 responsive to ambient noise electrical signals received by microphone 48 when switch element 52 is positioned in the second switch position. While the values of the electrical signals provided to the determiner 58 are, in part, dependent upon the pick-up sensitivity of the microphone 48, such signals provide a relative indication of the ambient noise levels at the area in which the mobile station 12 is positioned. Determinations of the ambient noise level determiner 58 are provided to the control circuitry 54 by way of the line 62. In an exemplary implementation, the control circuitry 54 and the determiner 58 are embodied in a processor 64, and the functions provided by the control circuitry 54 and the determiner 58 are, at least in part, effectuated by the execution of algorithms at the processor 64.

The control circuitry is further coupled to an annunciator 66 by way of the line 68. The annunciator 66 is here operable to generate an intermittent ringing tone, analogous to the tone generated by a wire line telephonic device. Control signals generated by the control circuitry on the line 68 are determinative of the amplitude of the ringing signal generated by the annunciator. Selection of the amplitude of the ringing signal is responsive to determinations made by the determiner 58. In one implementation, the ringing tone is selectively of two different levels. When the ambient noise levels determined by the determiner are beneath a selected threshold level, the ringing tone is of a first amplitude level. And, when the ambient noise level determined by the determiner are beyond the selected threshold, the ringing tone is caused to be of an increased amplitude. In another implementation, a plurality of different ringing level amplitudes are selectably formed responsive to determinations made by the determiner. Such plurality of ringing levels form, for instance, a step function, or increase in direct proportion to the determinations made by the determiner 58.

The annunciator 66 is here shown to include a tone oscillator 72, a programmable amplifier 74, and a speaker 76. The tone oscillator 72 is operable to generate a tone on the line 78 which is coupled to the amplifier 74. The amplifier is operable to amplify the tone provided thereto by way of the line 78 at an amplification level dependent upon values of control signals generated by the control circuitry on the line 68 and also provided to the amplifier 74. The speaker 76 is coupled to receive amplified tones generated by the amplifier 74 on the line 82. Thereby, the amplitude level, i.e., the loudness level of the ringing tone generated by the annunciator 66 is responsive to ambient noise levels determined by the determiner 58.

In the exemplary implementation, the switch element 52 is normally in the first switch position to couple the microphone 48 with the transmitter circuitry 44. When a paging signal is received at the mobile station 12 and processed by the receiver circuitry 42, indications of reception of the paging signal are provided to the control circuitry by way of the line 56. The control circuitry is operable, responsive thereto, to generate a signal on the line 62 to cause repositioning of the switch position of the switch element 52 into the second switch position for a selected time period. The time period during which the switch element is positioned in the second switch position is great enough to provide a sampling period by which determinations of ambient noise levels can be made by the determiner 58. Subsequent to such selected time period, the switch position is returned to the first switch position. Determinations made by the determiner 58 are provided to the control circuitry 54, and the control circuitry thereafter generates the control signals on the line 68 to control the amplitude of the ringing tone generated by the annunciator 66.

The mobile station 12 further includes an input actuator 84 having one or more actuation keys actuable by a user. In an exemplary implementation, the actuator 84 is formed of an actuation key of the telephonic keypad, which conventionally forms a portion of a mobile station. Here, the actuation of the actuator 84 by a user causes selection or deselection of the automatic ringervolume function, described above. That is to say, by appropriate actuation of the actuator 84, a user is able to override selection of the annunciation magnitude responsive to determinations by the determiner 58. A default annunciation level is instead used, or, in another embodiment, additional user actuation of the actuator 84 causes user-selection of the annunciation level. The actuator 84 is here shown to be coupled to the control circuitry 54 by way of the line 85. Algorithms executable by the circuitry 54 responsive to input actuations generated by the actuator 84 cause the selection/deselection and user selections, as appropriate.

Figure 3:
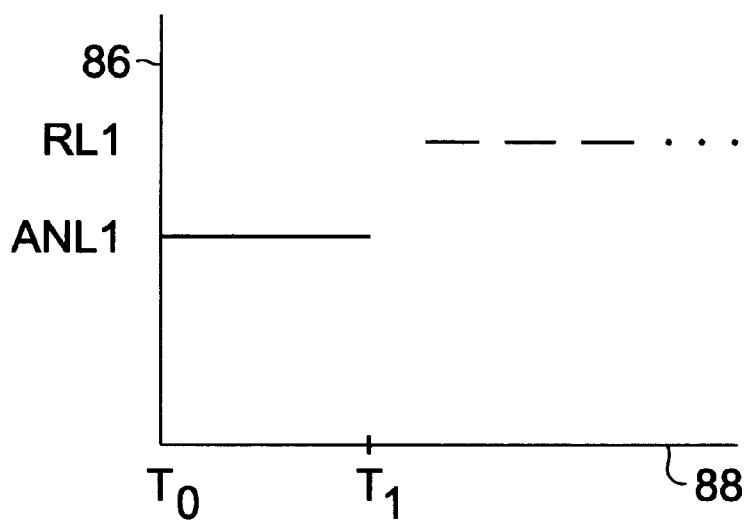
FIG. 3 illustrates a graphical representation showing the relationship between levels of ambient noise determined during operation of an embodiment of the present invention and selection of the loudness level of the ringing tone subsequent to the ambient noise level determination.

FIG. 3 graphically represents the relationship between the amplitude of the ringing tone generated during operation of an embodiment of the present invention relative to ambient noise levels determined by the determiners 58 (shown in FIG. 2). Here, sound levels, in terms of, e.g., decibels (dB) are plotted along the ordinate axis 86 as a function of time, plotted along the abscissa axis 88. Here, at time $T_0$, a paging signal is received at the mobile station and the switch position of the switch element 52 is caused to be positioned in the second switch position for a selected time period extending until time $T_1$. Responsive to ambient noise levels during the selected time period, a determination is made by the determiner 58 that the ambient noise levels correspond to a noise amplitude indicated by ANL1 in the Figure. Responsive to such a determination, the control circuitry 54 generates control signals to cause an intermittent ringing tone to be generated of a loudness level indicated by RL1. The ringing level is of a loudness level permitting its detection above the ambient noise level and is also of a loudness level not to be inappropriately loud, relative to the ambient noise level.

Figure 4:
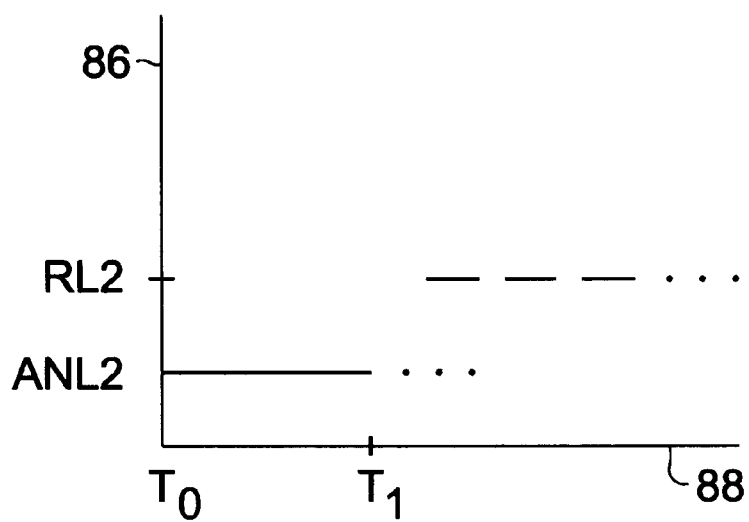
FIG. 4 illustrates a graphical representation, similar to that shown in FIG. 3, but here in which the ambient noise level is determined to be of a different level.

FIG. 4 illustrates another graphical representation, analogous to that shown in FIG. 3. Again, sound is plotted on the axis 86 and time is plotted along the axis 88. Again, a paging signal is received at the mobile station at time To and the switch position of the switch element 52 is caused to be in the second switch position for a time period extending until time $T_1$. Here, the determiner 58 determines the ambient noise levels to be of a decrease level, here ANL2. Responsive to such a determination, the control circuitry 54 causes the annunciator 66 to generate intermittent ringing tones of a loudness level indicated by RL2. Here again, the loudness level of the ringing tone is selected to be of a loudness level facilitating a user's detection of the ringing tone over the ambient noise, but not of a loudness level inappropriately high.

The loudness level of the ringing tone is thereby dynamically determined just prior to termination of a call at the mobile station. The loudness level of a ringing tone generated by the mobile station thereby is better able to be selected to be of a loudness level appropriate for the conditions in which the mobile station is positioned.

Figure 5:
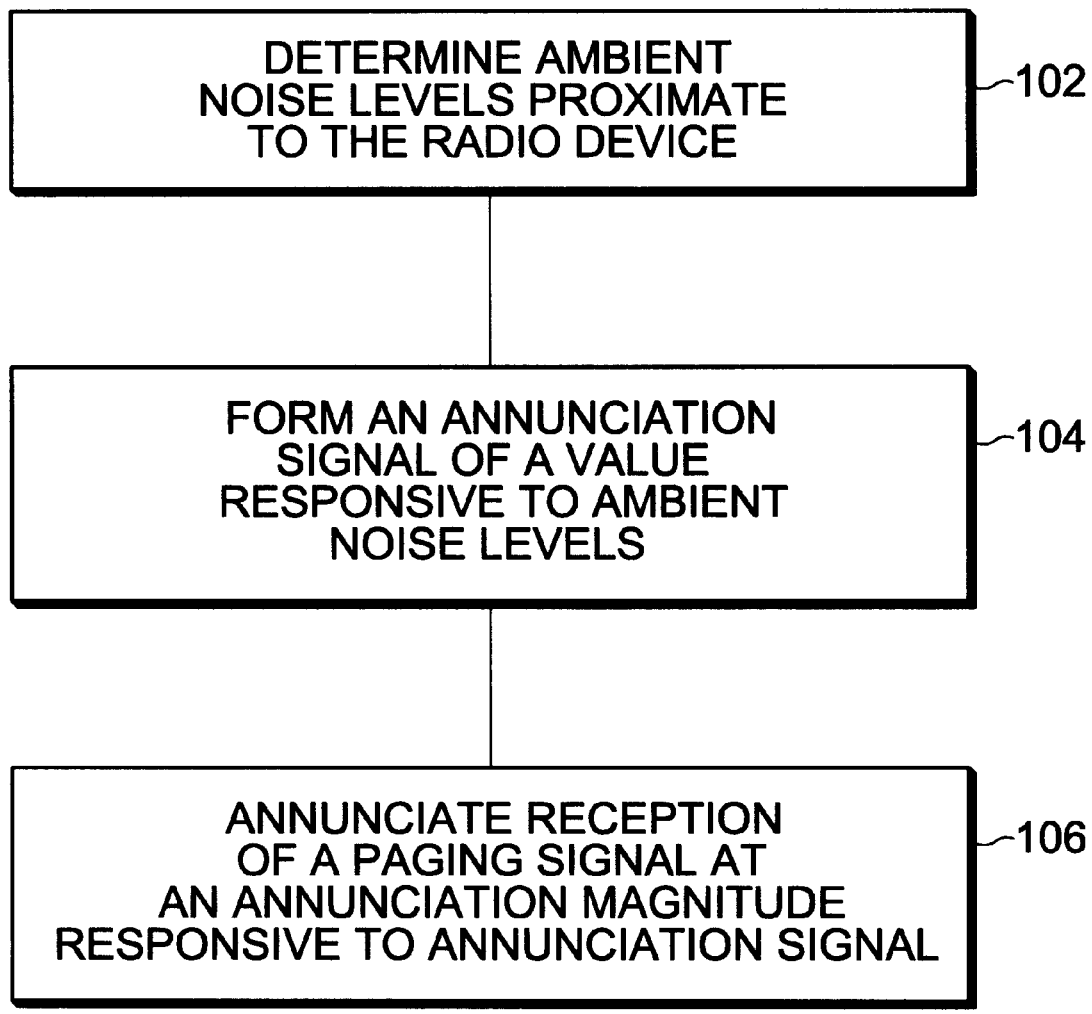
FIG. 5 illustrates the method steps of the method of operation of an embodiment of the present invention.

FIG. 5 illustrates a method, shown generally at 98, of an embodiment of the present invention. The method annunciates reception at radio receiver circuitry of the radio device of a paging signal transmitted to the radio device.

First, and as indicated by the block 102, a determination is made of at least a relative level of ambient noise proximate to the radio device. Then, and as indicated by the block 104, an annunciation signal is formed. The annunciation signal is of a value responsive to the level of ambient noise determined during the step of determining.

Then, and as indicated by the block 106, the reception of the paging signal is annunciated at an annunciation magnitude responsive to the value of the annunciation signal.

Operation of an embodiment of the present invention thereby provides a manner by which to annunciate a terminating call, terminating at a mobile station. A ringing tone is generated to annunciate the terminating call wherein the loudness of the ringing tone is dependent upon ambient noise levels proximate to the mobile station. If high levels of ambient noise level, the ringing tone is caused to be relatively loud, thereby to remain noticeable over the ambient noise. And, when there is only a low level of ambient noise, the ringing tone is caused to be of a relatively low loudness level. Thereby, a user of the mobile station is able to hear the ringing tone, but the ringing tone is not inappropriately loud.

The previous descriptions are of preferred examples for implementing the invention, and the scope of the invention should not necessarily be limited by this description. The scope of the present invention is defined by the following claims.

I claim:

1. In a radio device having radio transmitter circuitry and having radio receiver circuitry for receiving a paging signal terminating at the radio device, a combination with the radio receiver circuitry of annunciator apparatus for annunciating reception of the paging signal at the radio device, said annunciator apparatus comprising:

an acoustic transducer for converting acoustic energy into electrical signals;

an ambient noise level determiner for receiving indications of ambient noise proximate to the radio device and for determining a level of the ambient noise proximate to the radio device;

a two-position switch responsive to reception of the paging signal at the radio device, and operable in response thereto to assume a second switch position whereat said acoustic transducer is coupled to said ambient noise level determiner for a predetermined time interval, said two-position switch returning to a first switch position at an end of said predetermined time interval whereupon said acoustic transducer is decoupled from said ambient noise level determiner and said acoustic transducer is coupled to the radio transmitter circuitry; and an annunciation signal level selector coupled to said ambient noise level determiner, said annunciation signal level selector for generating an annunciation signal for causing annunciation of the reception of the paging signal at a selected annunciation magnitude at the end of said predetermined time interval, the selected annunciation magnitude responsive to determinations of the level of the ambient noise determined by said ambient noise level determiner;

said ambient noise level determiner determining the level of the ambient noise responsive to electrical signal provided thereto by said acoustic transducer during said predetermined time interval.

2. The apparatus of claim 1 further comprising an audio annunciator coupled to receive the annunciation signal generated by said annunciation signal level selector, said audio annunciator for generating an audio annunciation at the end of said predetermined time interval of an amplitude responsive to the selected annunciation amplitude.

3. The apparatus of claim 8 wherein said audio annunciator comprises a tone oscillator for generating an oscillating tone.

4. The apparatus of claim 3 wherein said audio annunciator further comprises a programmable amplifier coupled to receive the oscillating tone generated by said tone oscillator and to receive the annunciation signal generated by said annunciation signal level selector, the programmable amplifier for amplifying the oscillating tone by an amount proportional to the selected annunciation magnitude of the annunciation signal.

5. The apparatus of claim 4 wherein the amplitude of the audio annunciation generated by said audio annunciator is selectably of a first amplitude when the selected annunciation amplitude is beneath a selected value and is selectably of at least a second amplitude when the selected annunciation amplitude is above the selected value.

6. The apparatus of claim 5 wherein the radio telephone includes a processor, wherein said ambient noise level determiner comprises an algorithm executable by the processor, and wherein said annunciation signal level selector comprises an algorithm executable by the processor.

7. The apparatus of claim 1 wherein the radio device comprises a radio telephone, wherein the paging signal is transmitted to the radio telephone to be received thereat to indicate a call to be terminated at the radio telephone and wherein the annunciation signal generated by said annunciation signal level selector operates at the end of said predetermined time interval to announce the call to be terminated at the radio telephone.

8. A method for annunciating reception at radio receiver circuitry within a radio device of a paging signal terminating at the radio device, said method comprising:

receiving the paging signal at the radio device;

in response to receiving said paging signal at the radio device, configuring a switch to couple an acoustic transducer to an ambient noise level determiner for a predetermined time interval;

utilizing said acoustic transducer during said predetermined time interval to determine a level of ambient noise proximate to the radio device;

forming an annunciation signal of a value responsive to the level of ambient noise determined during said step of utilizing;

at an end of said predetermined time interval, annunciating the reception of the paging signal at an annunciation magnitude responsive to the value of the annunciation signal; and at the end of said predetermined time interval, configuring said switch to decouple said acoustic transducer from said ambient noise level determiner and to couple said acoustic transducer to radio transmitting circuitry within the radio device.

* * * * *